Dec. 31, 1940.  J. C. PRIDGEN  2,227,366
REVERSIBLE PLOW
Filed Feb. 9, 1940  2 Sheets-Sheet 1
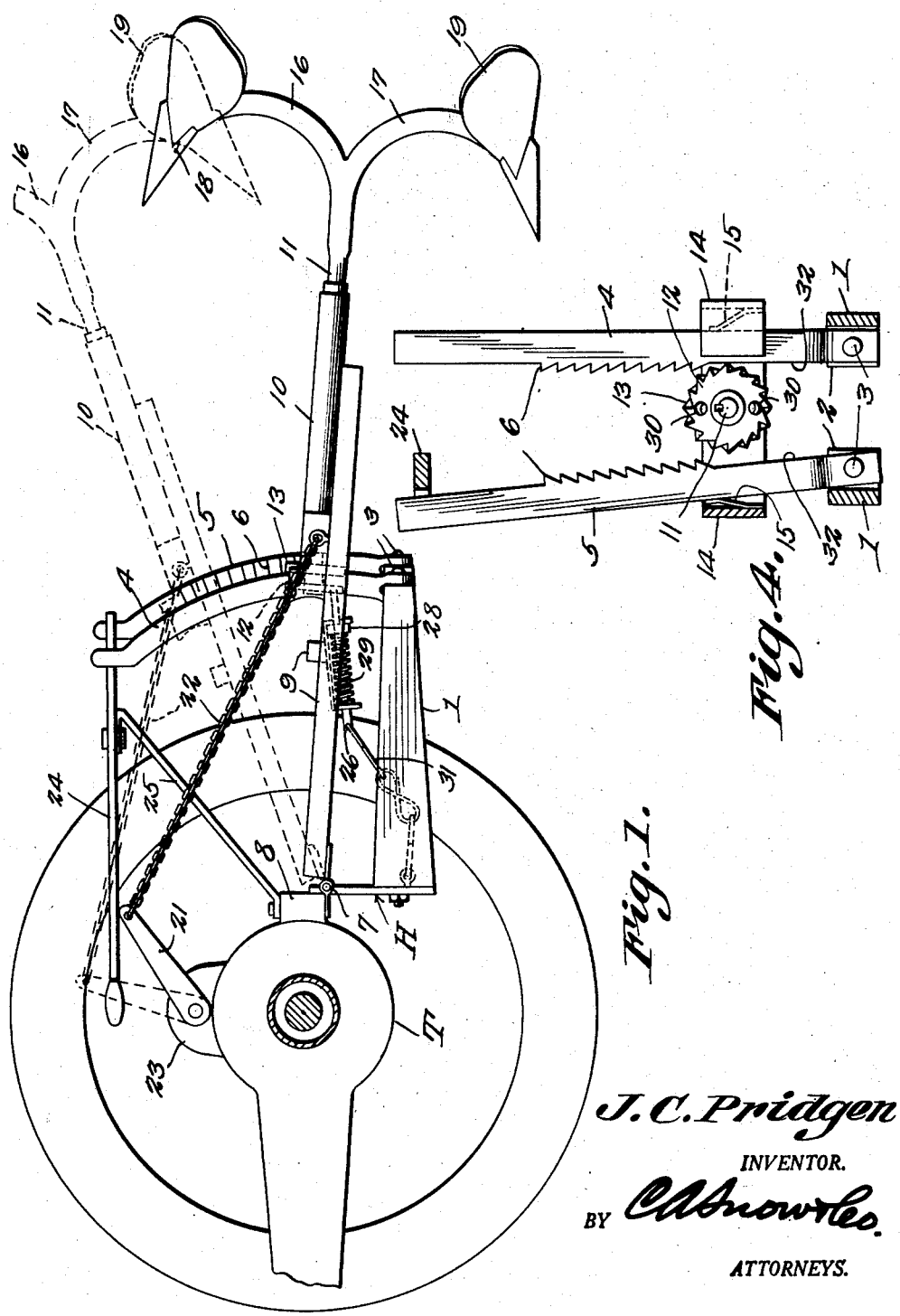
J.C. Pridgen
INVENTOR.
BY CAKnowles
ATTORNEYS.

Dec. 31, 1940.  J. C. PRIDGEN  2,227,366
REVERSIBLE PLOW
Filed Feb. 9, 1940  2 Sheets-Sheet 2
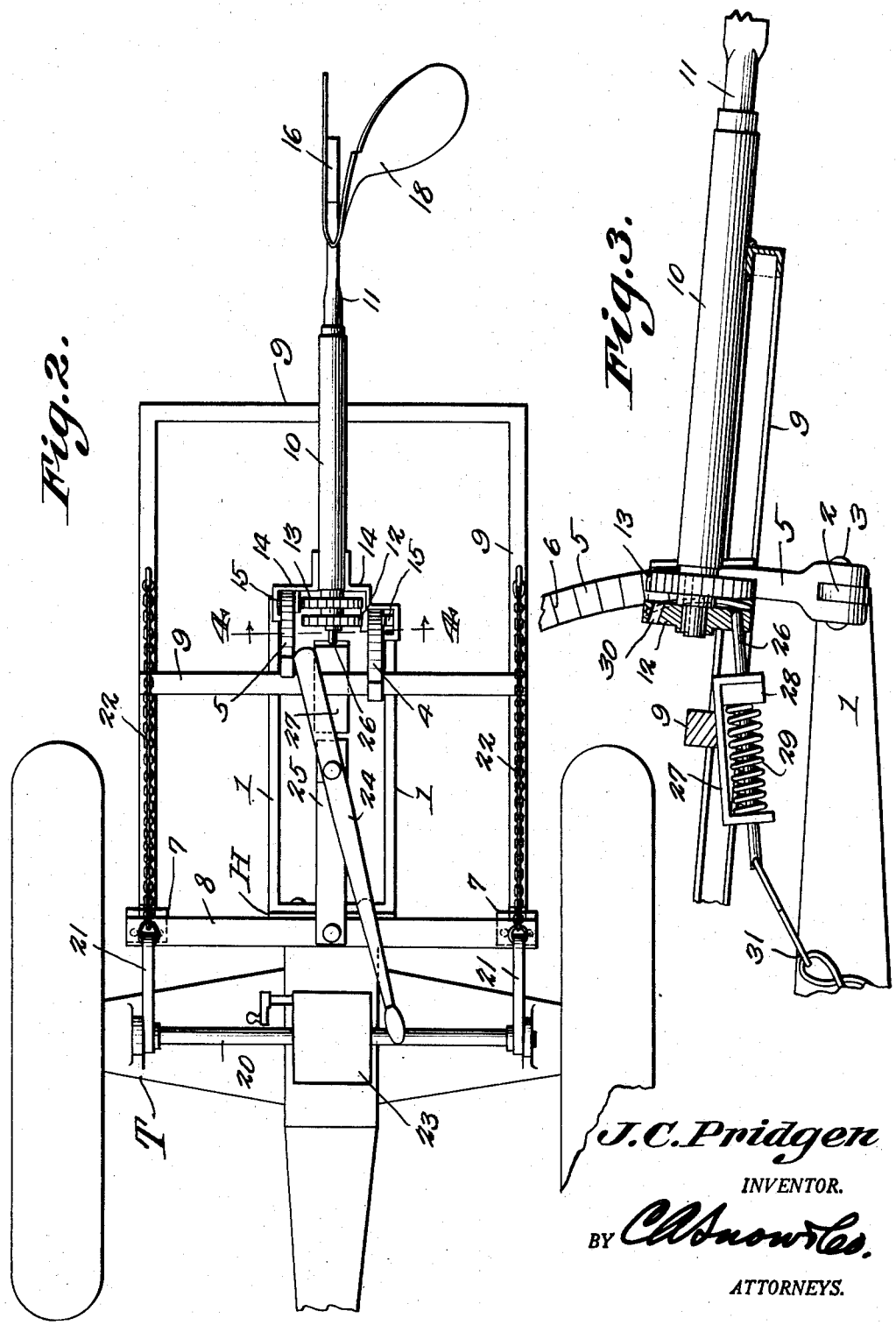
J.C. Pridgen
INVENTOR.
BY
ATTORNEYS.

Patented Dec. 31, 1940

2,227,366

UNITED STATES PATENT OFFICE 2,227,366

REVERSIBLE PLOW

Jesse C. Pridgen, Norlina, N. C.

Application February 9, 1940, Serial No. 318,170

7 Claims. (Cl. 97—26)

This invention relates to a plow, one of the objects being to provide a means whereby the plow can be reversed at each end of a row so that it can return along a line close to and parallel with the previously formed furrow.

Plows generally used necessitate the formation of furrows along all edges of the field thence inwardly toward the center.

The present invention provides a means whereby the plow can quickly be reversed on reaching each end of each furrow so that, by making an abrupt turn, it can then be used to plow the next furrow, throwing the soil in the same direction as that removed from the preceding furrow.

A further object is to provide reversing mechanism which is simple and efficient in construction and which can be employed either for oscillating the plow back and forth from one position to another or for rotating it from one position to another as may be found most expedient.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a side elevation of a plow embodying the present improvements, a portion of the tractor to which it is connected being shown in section and one of the positions of the plow being indicated by broken lines while another position is indicated by full lines.

Figure 2 is a plan view of the structure shown in Figure 1.

Figure 3 is an enlarged section through a portion of the structure and illustrating its locking means, part of the locking means being in section.

Figure 4 is an enlarged section on line 4—4, Figure 2, the ratchet bars being shown in elevation and the locking pin being removed.

Referring to the figures by characters of reference, T designates a portion of a tractor having a hitch H to which is attached a rearwardly extended frame 1 including side arms the rear ends of which are extended toward each other as at 2 and are engaged by pivots 3 which serve to connect to these ends opposed ratchet bars 4 and 5. These ratchet bars are curved upwardly and forwardly and the inner sides of the bars are provided with ratchet teeth 6 pitched upwardly as shown particularly in Figure 4.

The ratchet bars 4 and 5 are substantially concentric with the transverse axis of alined hinges 7 connected to a cross-beam 8 rigidly attached to the tractor. A plow frame 9 is joined to beam 8 by the hinges 7 and fixedly mounted to the rear portion thereof is a rearwardly extended bearing sleeve 10 in which a shank 11 is mounted for rotation. The forward end of this shank is positioned between the ratchet bars 4 and 5 and has secured to it a pair of ratchet wheels 12 and 13, the teeth of each wheel being pitched oppositely to the teeth of the other wheel and these wheels being so located that one of them can be engaged by one of the ratchet bars while the other can be engaged by the other ratchet bar. The forward end of the bearing sleeve 10 is provided with oppositely extending brackets 14 which embrace the respective ratchet bars 4 and 5 and carry springs 15 which tend constantly to thrust the ratchet bars toward each other.

The rotatable shank 11, in the structure illustrated, has oppositely extending standards 16 and 17 on its rear end and each of these standards carries a plow, the plows being indicated at 18 and 19 respectively. The plows are oppositely disposed so that when the structure is moving in one direction along a field the lowermost plow will throw the soil in one direction and, when the other plow is lowered and the movement of the apparatus is reversed, the soil will continue to be thrown in the same direction as that from the previously formed furrow. Although one form of plow has been shown connected to each of the standards, it is to be understood that any type of plow either of the mold-board type, disk type, or the like could be used.

The frame 9 is adapted to be swung upwardly and downwardly by any suitable means provided for that purpose. For example a transverse shaft 20 may be mounted on the tractor and provided with arms 21 connected by chains 22 or the like to the sides of the frame. This shaft can be operated by hydraulic means, by hand, or other agency. In the structure shown the shaft 20 is extended through the housing 23 of a hydraulic lift and can be operated at any time desired for the purpose of rotating shaft 20 to lift frame 9 and for releasing the shaft to permit the frame to gravitate back to its normal position.

Extending between the upper end portions of the ratchet bars 4 and 5 is a control lever 24 mounted on a standard 25 and adapted to be swung laterally. This lever, when actuated, can be moved against the upper end of either of the ratchet bars for the purpose of pushing it laterally away from normal position. In Figure 4 one of the ratchet bars has been shown in normal position while the other ratchet bar has been shown pressed away from normal position.

It is to be understood that the parts are normally located as shown by full lines in Figure 1. When moving across a field the lowermost plow will dig a furrow and throw the soil in one direction. When the end of the furrow is reached the frame 9 is swung upwardly as indicated by broken lines in Figure 1 and this will cause the ratchet wheels 12 and 13 to wipe past the teeth 6 on the bars 4 and 5 so that stem 11 will not be rotated. When the frame 9 reaches the upper limit of its movement the ratchet wheels will arrive above the upper teeth 6. The tractor is turned so as to be in proper position to start another furrow and thereafter one of the ratchet bars is shifted laterally by means of lever 24 and frame 9 permitted to gravitate back to normal position. As a result of this action the ratchet wheel which cooperates with the unshifted ratchet bar will bring its teeth into engagement with the teeth of that bar with the result that the ratchet wheels and stem 11 will be rotated through 180° so that the plow which previously had been in an elevated position, will be brought into lowermost or active position. As this second plow is arranged oppositely to the first plow it will be obvious that as the tractor moves back to the other end of the field, the lowered plow, in forming a furrow, will throw the soil in the same direction as it was thrown from the previously formed furrow. When the end of the second furrow is reached the foregoing operation is repeated. If the same ratchet bar is shifted as was done at the completion of the previous operation, the plow stem 11 will again be rotated in the same direction when lowered. However if the ratchet bars 4 and 5 are shifted alternately at the ends of the respective rows, the plow stem 11 instead of being intermittently rotated in one direction, will be rotated back and forth so that the plows will be oscillated instead of rotated in order to bring one and then the other into active position. In either case the result obtained will be the same.

Should it be found desirable to lock the plows when in active position, a suitable locking means could be used. In the drawings one of these locking means has been illustrated. This includes a bolt 26 slidably mounted in a bracket 27 which is carried by a frame 9. This bolt has a collar 28 which constantly receives thrust from a spring 29 so that the bolt is held normally projected into one of two openings 30 formed in ratchet wheel 12 at diametrically opposed points. A flexible connection 31 is provided between the bolt and the hitch H and when the frame 9 is in lowermost position, this connection can be slack as shown in Figure 1. When the frame 9 is swung upwardly and before the ratchet wheels 12 and 13 reach the upper teeth 6, the connection 21 is drawn taut and operates to withdraw the bolt 26 from the opening 30 in which it is seated. As the frame starts downwardly and the ratchet wheels begin to rotate, the bolt 26 is gradually paid out and the parts are so timed that when the plow being lowered has reached its proper position, the lowermost opening 30 in the ratchet wheel 12 will be brought into line with bolt 26 so that said bolt will thus be free to snap into the opening and lock the stem or shank 11 against rotation.

It is to be understood that the lowermost teeth 6 on the two ratchet bars 4 and 5 are so located that the ratchet wheels will become disengaged therefrom as soon as shank 11 has completed a one-half rotation or, in other words, as soon as a plow has been brought to lowermost position. These lowermost teeth of the ratchet bars are spaced from the frame 1 so that a certain amount of up and down swinging movement of frame 9 and the plows connected thereto is permissible without bringing the ratchet wheels into engagement with the teeth of the ratchet bars. These clearance spaces have been indicated at 32 in Figure 4.

What is claimed is:

1. A reversible plow for attachment to a tractor or the like including opposed arcuate ratchet bars pivotally mounted and having their teeth pitched in the same direction, means for connecting said bars to a tractor, a plow frame, means for pivotally connecting the frame to a tractor for up and down swinging movement relative thereto, a shank mounted for rotation relative to and projecting from the frame, oppositely disposed soil-engaging elements carried by said shank, ratchet wheels secured to the shank and positioned for engagement by the respective ratchet bars, the teeth of each wheel being pitched oppositely to the teeth on the other wheel, means for lifting the frame and wheels relative to the ratchet bars and releasing them for downward movement, each of said bars cooperating with one of the ratchet wheels for rotating said wheel and the shank during the movement of the frame in one direction, and means under the control of the operator for holding one of the bars out of engagement with its ratchet wheel.

2. A reversible plow for attachment to a tractor or the like, including a pivotally mounted ratchet bar, means for connecting the same to a tractor, a plow frame, means for connecting the frame to a tractor for up and down movement relative to the bar, a shank mounted for rotation on the frame and movable therewith, oppositely arranged plows carried by the shank, a ratchet wheel rotatable with the shank and movable in one direction along the ratchet bar to rotate the shank, means for raising the frame and the shank and releasing it for gravitation, and means under the control of an operator for holding the bar out of engagement with the ratchet wheel.

3. A reversible plow for attachment to a tractor or the like, including a pivotally mounted ratchet bar, means for connecting the same to a tractor, a plow frame, means for connecting the frame to a tractor for up and down movement relative to the bar, a shank mounted for rotation on the frame and movable therewith, oppositely arranged plows carried by the shank, a ratchet wheel rotatable with the shank and movable in one direction along the ratchet bar to rotate the shank, means for raising the frame and the shank and releasing it for gravitation, means under the control of an operator for holding the bar out of engagement with the ratchet wheel, and cooperating means on the frame and ratchet wheel for locking said wheel against rotation on reaching one limit of its movement and for unlocking it while moving in the opposite direction relative to the bar.

4. A reversible plow for attachment to a tractor or the like, including a pivotally mounted ratchet bar, means for connecting the same to a tractor, a plow frame, means for connecting the frame to a tractor for up and down movement relative to the bar, a shank mounted for rotation on the frame and movable therewith, oppositely arranged plows carried by the shank, a ratchet wheel rotatable with the shank and movable in one direction along the ratchet bar to rotate the shank, means for raising the frame and the shank and releasing it for gravitation, means under the control of an operator for holding the bar out of engagement with the ratchet wheel, and cooperating means on the frame and ratchet wheel for locking said wheel against rotation on reaching one limit of its movement and for unlocking it while moving in the opposite direction relative to the bar, said means including a spring-pressed bolt, there being diametrically opposite apertures in the ratchet wheel positioned for separate reception of the bolt, and means connected to the bolt for retracting it from the aperture in which it is seated when the frame and ratchet are moved in one direction relative to the ratchet bar.

5. The combination with a ratchet bar and means for joining the same to a tractor, of reversible soil-engaging means, a shank extending therefrom, a frame mounted for up and down swinging movement, said shank being carried by the frame, means for pivotally connecting said frame to a tractor, and means on the shank and cooperating with the ratchet bar for rotating the shank when the frame is moved in one direction, thereby to reverse the position of the soil-engaging means.

6. The combination with a ratchet bar and means for joining the same to a tractor, of reversible soil-engaging means, a shank extending therefrom, a frame mounted for up and down swinging movement, said shank being carried by the frame, means for pivotally connecting said frame to a tractor, and means on the shank and cooperating with the ratchet bar for rotating the shank when the frame is moved in one direction, thereby to reverse the position of the soil-engaging means, and means under the control of an operator for shifting the ratchet bar out of active position during the movement of the frame.

7. The combination with a ratchet bar and means for joining the same to a tractor, of reversible soil-engaging means, a shank extending therefrom, a frame mounted for up and down swinging movement, said shank being carried by the frame, means for pivotally connecting said frame to a tractor, and means on the shank and cooperating with the ratchet bar for rotating the shank when the frame is moved in one direction, thereby to reverse the position of the soil-engaging means, and means for automatically locking the shank against rotation when the frame reaches one limit of its movement.

JESSE C. PRIDGEN.